(12) United States Patent
Langner

(10) Patent No.: US 11,632,295 B1
(45) Date of Patent: Apr. 18, 2023

(54) NETWORK BOOT FOR ETHERNET PHYSICAL-LAYER DEVICES

(71) Applicant: Marvell Asia Pte Ltd, Singapore (SG)

(72) Inventor: Paul Langner, Fremont, CA (US)

(73) Assignee: MARVELL ASIA PTE LTD, Singapore (SG)

( * ) Notice: Subject to any disclaimer, the term of this patent is extended or adjusted under 35 U.S.C. 154(b) by 208 days.

(21) Appl. No.: 17/207,674

(22) Filed: Mar. 21, 2021

Related U.S. Application Data

(60) Provisional application No. 62/993,496, filed on Mar. 23, 2020.

(51) Int. Cl.
| | |
|---|---|
| *H04L 41/0803* | (2022.01) |
| *H04L 67/104* | (2022.01) |
| *H04L 69/323* | (2022.01) |
| *H04L 41/00* | (2022.01) |

(52) U.S. Cl.
CPC .......... *H04L 41/0803* (2013.01); *H04L 41/24* (2013.01); *H04L 67/104* (2013.01); *H04L 69/323* (2013.01)

(58) Field of Classification Search
None
See application file for complete search history.

(56) References Cited

U.S. PATENT DOCUMENTS

| | | | | |
|---|---|---|---|---|
| 8,606,934 | B2 * | 12/2013 | Ayyar | H04L 69/324 370/453 |
| 2020/0313872 | A1 * | 10/2020 | Mondello | H04L 63/0442 |
| 2021/0232403 | A1 * | 7/2021 | Bhaskar | G06F 9/4401 |

OTHER PUBLICATIONS

IEEE Std 802.3cg-2019, "IEEE Standard for Ethernet: Amendment 5: Physical Layer Specifications and Management Parameters for 10 Mb/s Operation and Associated Power Delivery over a Single Balanced Pair of Conductors", pp. 1-256, Feb. 2020.

IEEE Std 802.3bw-2015, "IEEE Standard for Ethernet: Amendment 1: Physical Layer Specifications and Management Parameters for 100 Mb/s Operation over a Single Balanced Twisted Pair Cable (100BASE-T1)", pp. 1-88, Mar. 2016.

IEEE Std 802.3bp-2016, "IEEE Standard for Ethernet: Amendment 4: Physical Layer Specifications and Management Parameters for 1 Mb/s Operation over a Single Twisted-Pair Copper Cable", pp. 1-211, Sep. 2016.

IEEE Std 802.3ch-2020, "IEEE Standard for Ethernet: Amendment 8: Physical Layer Specifications and Management Parameters for 2.5 GB/s, 5 GB/s, and 10 GB/s Automotive Electrical Ethernet", pp. 1-207, Jun. 2020.

IEEE Std. 802.3-2018, "IEEE Standard for Ethernet: Auto-Negotiation for Single Differential-Pair Media", Section 7, clause 98, pp. 206-236, Aug. 2018.

* cited by examiner

*Primary Examiner* — Angela Nguyen

(57) ABSTRACT

An Ethernet physical-layer (PHY) device includes an analog front-end and one or more processors. The analog front-end is configured to interface with an Ethernet link that is coupled to a peer Ethernet PHY device. The one or more processors are configured to receive a firmware image from the peer Ethernet PHY device over the Ethernet link, and to boot the Ethernet PHY device and establish Ethernet communication with the peer Ethernet PHY device in accordance with the received firmware image.

20 Claims, 3 Drawing Sheets

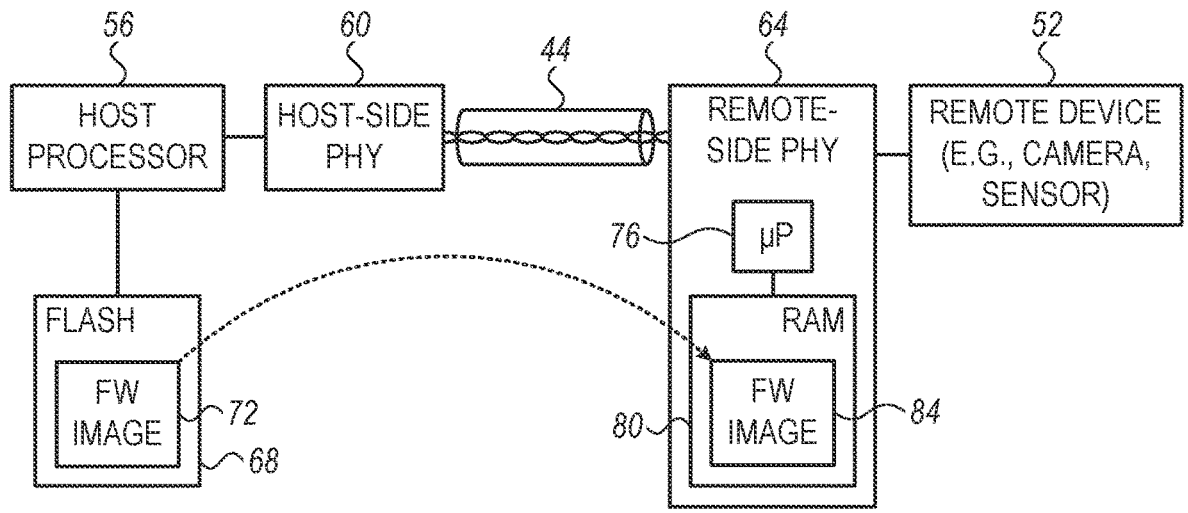
FIG. 2
FIG. 3
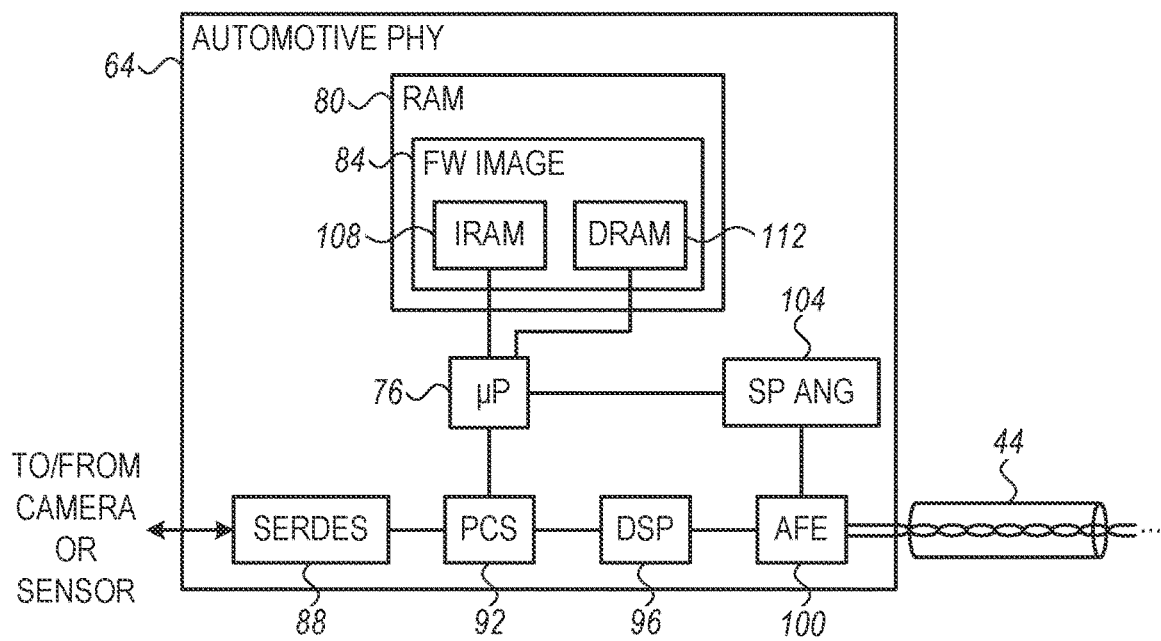

NETWORK BOOT FOR ETHERNET PHYSICAL-LAYER DEVICES

CROSS-REFERENCE TO RELATED APPLICATIONS

This application claims the benefit of U.S. Provisional Patent Application 62/993,496, filed Mar. 23, 2020, whose disclosure is incorporated herein by reference.

FIELD OF THE DISCLOSURE

The present disclosure relates generally to Ethernet communication, and particularly to methods and systems for management of firmware images of Ethernet physical-layer devices.

BACKGROUND

Various applications, such as automotive in-car communication systems, certain industrial communication systems and smart-home systems, require communication at high data rates over relatively small distances, e.g., on the order of several meters. Several types of protocols and communication media have been proposed for such applications. For example, Ethernet communication over twisted-pair copper wire media is specified in "IEEE Standard for Ethernet—Amendment 5: Physical Layer Specifications and Management Parameters for 10 Mb/s Operation and Associated Power Delivery over a Single Balanced Pair of Conductors," IEEE 802.3cg-2019, February, 2020; in "IEEE Standard for Ethernet Amendment 1: Physical Layer Specifications and Management Parameters for 100 Mb/s Operation over a Single Balanced Twisted Pair Cable (100BASE-T1)," IEEE 802.3bw-2015, March, 2016; in "IEEE Standard for Ethernet Amendment 4: Physical Layer Specifications and Management Parameters for 1 Gb/s Operation over a Single Twisted-Pair Copper Cable," IEEE 802.3 bp-2016, September, 2016; and in "IEEE Standard for Ethernet—Amendment 8: Physical Layer Specifications and Management Parameters for 2.5 Gb/s, 5 Gb/s, and 10 Gb/s Automotive Electrical Ethernet," IEEE 802.3ch-2020, June, 2020.

As part of establishing an Ethernet communication link, Ethernet devices ("link partners") may carry out an auto-negotiation process in order to agree on the supported data rates, operational modes and/or other capabilities. An auto-negotiation process of this sort is specified, for example, in IEEE Standard 802.3-2018, Section Seven, Clause 98, entitled "Auto-negotiation for single differential-pair media," June, 2018, which is incorporated herein by reference.

The description above is presented as a general overview of related art in this field and should not be construed as an admission that any of the information it contains constitutes prior art against the present patent application.

SUMMARY

An embodiment that is described herein provides an Ethernet physical-layer (PHY) device including an analog front-end and one or more processors. The analog front-end is configured to interface with an Ethernet link that is coupled to a peer Ethernet PHY device. The one or more processors are configured to receive a firmware image from the peer Ethernet PHY device over the Ethernet link, and to boot the Ethernet PHY device and establish Ethernet communication with the peer Ethernet PHY device in accordance with the received firmware image.

In an embodiment, the one or more processors are configured to store the received firmware image in volatile memory. In some embodiments, the one or more processors are configured to receive the firmware image during an auto-negotiation transaction with the peer Ethernet PHY device. In an example embodiment, the one or more processors are configured to request the firmware image from the peer PHY device, or to receive a notification of transmission of the firmware image, using a reserved value of a selector field in a base page of the auto-negotiation transaction. In a disclosed embodiment, the one or more processors are configured to boot the Ethernet PHY device in accordance with the received firmware image, and then to auto-negotiate a common data rate for the Ethernet communication with the peer Ethernet PHY device.

There is additionally provided, in accordance with an embodiment that is described herein, an Ethernet physical-layer (PHY) device including an analog front-end and a processor. The analog front-end is configured to interface with an Ethernet link coupled to a peer Ethernet device. The processor is configured to send a firmware image to a peer Ethernet PHY device over the Ethernet link, and to establish Ethernet communication with the peer Ethernet PHY device after the peer PHY device has booted in accordance with the received firmware image.

In some embodiments, the processor is configured to send the firmware image during an auto-negotiation transaction with the peer Ethernet PHY device. In an example embodiment, the processor is configured to notify the peer PHY device of transmission of the firmware image, or to receive a notification that the firmware image is requested, using a reserved value of a selector field in a base page of the auto-negotiation transaction.

In an example embodiment, the processor is configured to retrieve the firmware image of the peer PHY device from a non-volatile memory. In another embodiment, the processor is configured to obtain the firmware image of the peer PHY device from a local host, and to send the obtained firmware image to the peer Ethernet PHY device over the Ethernet link.

There is also provided, in accordance with an embodiment that is described herein, a method for Ethernet communication in an Ethernet physical-layer (PHY) device. The method includes receiving a firmware image from a peer Ethernet PHY device over an Ethernet link. The Ethernet PHY device is booted, and Ethernet communication is established with the peer Ethernet PHY device in accordance with the received firmware image.

There is further provided, in accordance with an embodiment that is described herein, a method for Ethernet communication including sending a firmware image from an Ethernet physical-layer (PHY) device to a peer Ethernet PHY device over an Ethernet link. Ethernet communication is established with the peer Ethernet PHY device after the peer PHY device has booted in accordance with the received firmware image.

The present disclosure will be more fully understood from the following detailed description of the embodiments thereof, taken together with the drawings in which:

BRIEF DESCRIPTION OF THE DRAWINGS

FIG. 2 is a block diagram that schematically illustrates Ethernet PHY devices in the system of FIG. 1 that support downloading of firmware images, in accordance with an embodiment that is described herein;

FIG. 3 is a block diagram that schematically illustrates an internal structure of an automotive Ethernet PHY device in the system of FIG. 1, in accordance with an embodiment that is described herein.

DETAILED DESCRIPTION OF EMBODIMENTS

Embodiments that are described herein provide methods and systems for downloading firmware (FW) images to Ethernet PHY devices over Ethernet links. In some embodiments, an Ethernet PHY device comprises a processor that runs software code. As part of a bootstrapping ("boot") process of the PHY device, the processor receives a firmware image of the software code from a peer PHY device over an Ethernet link, and then completes the boot process and establishes Ethernet communication with the peer PHY device in accordance with the received firmware image.

In the present context, the term "FW image" refers to code and/or data, i.e., to at least part of the software code executed by the processor, and/or to one or more parameters or data values used in executing the software code.

In some embodiments, the Ethernet PHY device stores the received FW image in volatile memory, e.g., Random Access Memory (RAM), and executes the software code from the volatile memory. A configuration of this sort requires only a small-size non-volatile memory in the PHY device, e.g., for storing some initial kernel code and data. The cost of the PHY device can therefore be reduced considerably. In other words, the disclosed techniques enable implementation of a low-cost PHY device that contains only minimal non-volatile memory and obtains its software code over the network on each power-up event.

In some embodiments, the PHY device and the peer PHY device (referred to jointly as "link partners") establish Ethernet connectivity with one another by automatically negotiating a common data rate and a common set of capabilities. The auto-negotiation process is performed in accordance with IEEE 802.3, Clause 98, cited above. In embodiments described below, the link partners request and transfer the FW image using IEEE 802.3, Clause 98, protocol messages. Since in most practical cases both auto-negotiation and firmware download are performed on initialization of the PHY device, combining them into a single process using a single protocol reduces the overall link establishment time. In an example embodiment, the single process begins with a fast firmware download enabled by the IEEE 802.3, Clause 98, protocol, and then proceeds to IEEE 802.3, Clause 98, auto-negotiation.

Figure 1:
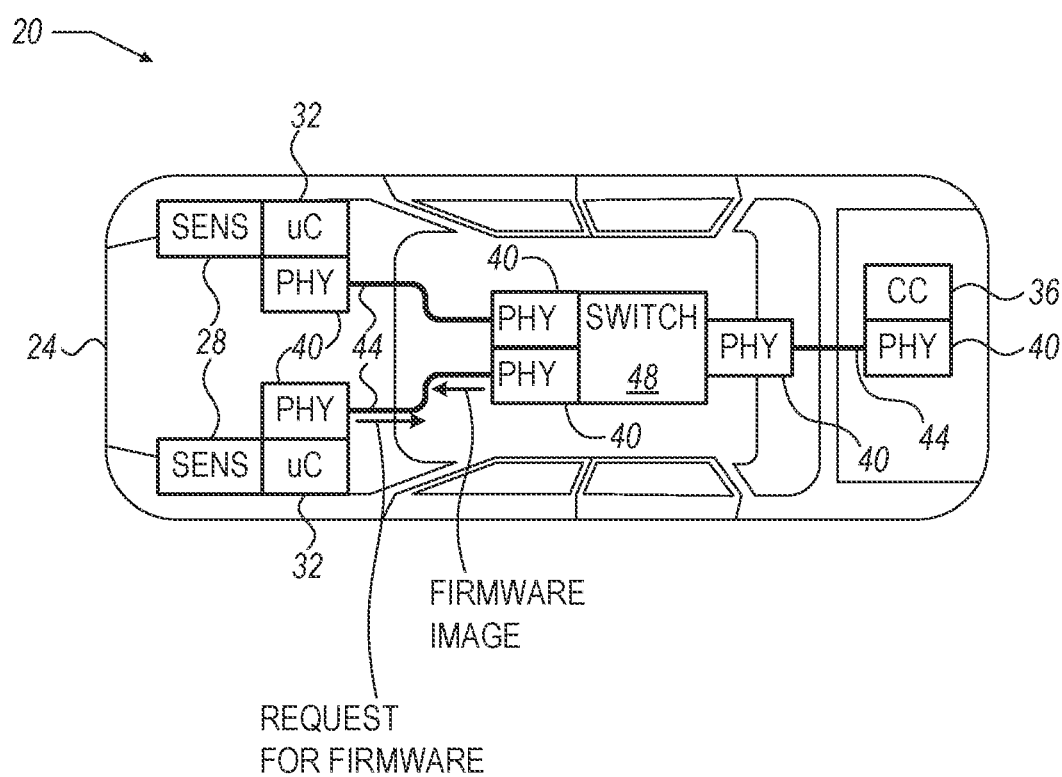
FIG. 1 is a block diagram that schematically illustrates an automotive communication system, in accordance with an embodiment that is described herein.

FIG. 1 is a block diagram that schematically illustrates an automotive communication system 20 with high EMC performance cabling, in accordance with an embodiment that is described herein. System 20 is installed in a vehicle 24, and comprises multiple sensors 28, an Ethernet switch 48, multiple microcontrollers (μC) 32, a central controller (CC) 36, and multiple Ethernet physical layer (PHY) devices 40. PHY devices 40 are also referred to as PHY transceivers, or simply "PHYs" for brevity.

In various embodiments, sensors 28 may comprise any suitable types of sensors. Several non-limiting examples of sensors comprise video cameras, velocity sensors, accelerometers, audio sensors, infra-red sensors, radar sensors, lidar sensors, ultrasonic sensors, rangefinders or other proximity sensors, and the like.

In the present example, each sensor 28 is connected to a respective microcontroller (μC) 32, which in turn is connected to a respective PHY device 40. The PHY device 40 of each sensor 28 is connected by a network cable 44 to a peer PHY device coupled to a port of switch 48. CC 36 is also connected to a port of switch 48 in a similar manner, via a network cable 44 and a pair of PHY devices 40.

In various embodiments, PHY devices 40 of system 20 may communicate over network cables 44 at any suitable bit rate. Example bit rates are 10 Mbps in accordance with IEEE 802.3cg (10Base-T1s), 100 Mbps in accordance with IEEE 802.3bw, 1 Gbps in accordance with IEEE 802.3 bp, or 10 Gbps in accordance with IEEE 802.3ch.

Typically, each PHY device 40 comprises one or more processors that run suitable software. In some embodiments PHY device 40 comprises only a single microprocessor, and all other functions of the PHY device are implemented in hardware. In other embodiments, PHY device 40 comprises a microprocessor and a Digital Signal Processor (DSP) that both run suitable software. In some embodiments described herein, a PHY device 40 is configured to receive a firmware (FW) image of the software of one or more of its processors from a peer PHY device 40, over cable 44. The PHY device is then configured to re-initialize and/or re-establish Ethernet communication with the peer PHY device, in accordance with the received FW image.

As noted above, the term "FW image" refers to at least part of the software code executed by a processor, and/or to one or more parameters or data values used in executing the software code. The process of receiving a FW image and re-establishing communication in accordance with the received FW image is referred to herein as "network boot." As will be described in detail below, in some embodiments a PHY device 40 performs network boot using the framework of the auto-negotiation process specified in IEEE 802.3, Clause 98, cited above.

FIG. 2 is a block diagram that schematically illustrates Ethernet PHY devices in system 20 of FIG. 1 that support downloading of firmware images, in accordance with an embodiment that is described herein. In the present example, a remote device 52 (e.g., a camera or sensor 28) in vehicle 24 sends data to a host processor 56 (e.g., to central computer 36) over network cable 44. Host processor 56 communicates over cable 44 using a host-side Ethernet PHY device 60, and remote device 52 communicates over cable 44 using a remote-side Ethernet PHY device 64. Host-side PHY device 60 and remote-side PHY device 64 may comprise, for example, a selected pair of PHY devices 40 in FIG. 1.

In some embodiments, remote-side PHY device 64 comprises a processor, in the present example a microprocessor (μP) 76. In the present context, the term "microprocessor" refers to any type of processor that runs software, including, for example, various controllers, processing cores, systems-on-chip and the like. Remote-side PHY device 64 further comprises a volatile memory, in the present example a Random Access Memory (RAM) 80. RAM 80 stores, inter alia, a FW image 84 of μP 76. FW image 84 comprises at least part of the software code of μP 76, and/or one or more parameters used in executing the software code. Additionally or alternatively, at least part of RAM 80 may be internal to μP 76.

In an embodiment, FW image 84 is stored in volatile memory, e.g., because remote-side PHY device 64 has only limited non-volatile memory space that is used for other purposes, or for any other reason. As such, FW image 84 is lost when remote-side PHY device 64 is switched-off, reset or loses power. Therefore, in some embodiments, the boot process of remote-side PHY device 64 comprises a step of obtaining FW image 84 from host-side PHY device 60 over cable 44.

In an embodiment, the configuration of system 20 is assumed to be static, in the sense that host-side PHY device 60 and/or host processor 56 are aware of the correct FW image to be provided to remote-side PHY device 64. Alternatively, if the system configuration changes, e.g., if remote-side PHY device 64 is replaced with a different device that requires a different FW image, host-side PHY device 60 and/or host processor 56 should be notified of this change or at least be provided with the correct FW image.

In the embodiment of FIG. 2, host processor 56 is coupled to a non-volatile memory, in the present example a Flash memory 68. Flash memory 68 stores, inter alia, a FW image 72 of μP 76 of remote-side PHY device 64. When remote-side PHY device 64 boots, e.g., following reset, host processor 56 retrieves FW image 72 from Flash memory 68 and sends the FW image to host-side PHY device 60. Host-side PHY device 60 sends the FW image to remote-side PHY device 64 over cable 44. In remote-side PHY device 64, μP 76 saves the received FW image (as FW image 84) in RAM 80. The newly-received FW image is then used for running μP 76.

The process of obtaining the FW image is typically initiated by μP 76. Typically, μP 76 comprises a small non-volatile memory (e.g., Flash memory or ROM) that stores limited-functionality kernel software. This kernel software performs, among other tasks, the initial boot operations needed for obtaining the FW image from host-side PHY device 60. In various embodiments, either host processor 56 or host-side PHY device 60 may respond to the request for the FW image. Host processor 56 or host-side PHY device 60 may obtain the FW image from local storage (e.g., Flash memory 68) or over the network.

In the example of FIG. 2, FW image 72 is stored in a non-volatile memory that is coupled to host processor 56. In such embodiments, host-side PHY device 60 may be similar (or even identical) in structure to remote-side PHY device 64, e.g., with regards to non-volatile memory resources. In alternative embodiments, host-side PHY device 60 may comprise (or may be coupled to) a Flash memory such as Flash memory 68, which stores FW image 72. In such embodiments, the FW image is sent from host-side PHY device 60 to remote-side PHY device 64, without having to involve host processor 56 in the boot process of the remote-side PHY device.

In the example of FIG. 2, a FW image is downloaded from a PHY device associated with a host processor to a PHY device associated with a remote device. The disclosed technique, however, is not limited to this scenario. In alternative embodiments, a FW image may be downloaded from any suitable PHY device to any suitable PHY device. Although the FW image is downloaded to the PHY device from its immediate link partner (i.e., the PHY device that is directly connected to the PHY device over Ethernet link 44), the FW image may originate from any other system element, e.g., over the network from central computer 36.

FIG. 3 is a block diagram that schematically illustrates additional details of the internal structure of remote-side automotive PHY device 64 of FIG. 2, in accordance with an embodiment that is described herein. In the present example, PHY device 64 comprises a signal transmission/reception chain that comprises a Serializer-Deserializer (SERDES) 88, a Physical Coding Sublayer (PCS) module 92, a Digital Signal Processing (DSP) module 96 and an Analog Front-End (AFE) 100.

In the upstream direction (remote to host), SERDES 88 receives data from the remote device (e.g., camera or sensor) over a suitable serial interface, and converts the serial data into a parallel data stream. PCS module 92 performs Ethernet PCS tasks, e.g., encodes and scrambles the data. DSP module 96 performs Ethernet Physical Medium Dependent (PMD) or Physical Medium Attachment (PMA) sublayer tasks, e.g., modulation. AFE 100 converts the modulated digital signal into an analog signal and transmits the signal over cable 44.

In the downstream direction (host to remote, if used, e.g., for controlling the remote device), AFE 100 receives an analog signal from cable 44. DSP module 96 performs PMD or PMA tasks such as demodulation. PCS module 92 performs PCS tasks such as decoding and unscrambling. SERDES 88 performs parallel-to-serial conversion and outputs the resulting serial stream to the remote device. In an embodiment, a Single-Pair Auto-Negotiation (SP ANG) module 104 performs initial auto-negotiation of parameters such as connect rate and determination of clock master.

In an embodiment, μP 76 controls the operation of remote-side PHY device 64, by running suitable software code. Tasks performed by μP 76 may comprise, for example, link start-up, optionally auto-negotiation, and control of DSP module 96. The software code, possibly along with corresponding data, is stored as FW image 84 in RAM 80. In the present example, FW image 84 is partitioned into a set of Instruction RAM (IRAM) digital words ("dWords") 108 that contain the software program code, and a set of Data RAM (DRAM) dWords 112 that contain the corresponding data, e.g., variable values and program data. The partitioning into separate IRAM and DRAM pages, however, is not mandatory. The FW image may have any other suitable structure and format. An example process of downloading FW image 84, including both IRAM dWords 108 and DRAM dWords 112, over cable 44 to PHY device 64, is described below with reference to FIG. 4.

In some embodiments, FW image 84 comprises program code to be executed by μP 76, and/or data to be used by such program code. Additionally or alternatively, in some embodiments FW image 84 comprises code and/or data to be downloaded and used by another processor in PHY device 64. Thus, generally, μP 76 may obtain over cable 44, and store in RAM 80, a FW image for use by any suitable processor in PHY device 64, e.g., by μP 76 itself or by a different processor.

The configurations of the various systems, PHY devices and host processors shown in FIGS. 1-3 are example configurations that are depicted solely for the sake of clarity. In alternative embodiments, any other suitable configurations can be used. The different elements of the PHY devices and host processors shown in FIGS. 1-3 may be implemented using dedicated hardware or firmware, such as using hard-wired or programmable logic, e.g., in an Application-Specific Integrated Circuit (ASIC) or Field-Programmable Gate Array (FPGA). Additionally or alternatively, some functions of the PHY devices and/or host processors may be implemented in software and/or using a combination of hardware and software elements. Elements that are not mandatory for understanding of the disclosed techniques have been omitted from the figure for the sake of clarity.

In some embodiments, some functions of the disclosed PHY devices and/or host processors, e.g., some or even all functions of microcontrollers 32, CC 36, host processor 56, PHY device 60, and/or PHY device 64 including but not limited to microprocessor 76 and DSP 96, may be implemented in one or more programmable processors, which are programmed in software to carry out the functions described herein. The software may be downloaded to any of the processors in electronic form, over a network, for example, or it may, alternatively or additionally, be provided and/or stored on non-transitory tangible media, such as magnetic, optical, or electronic memory.

Figure 4:
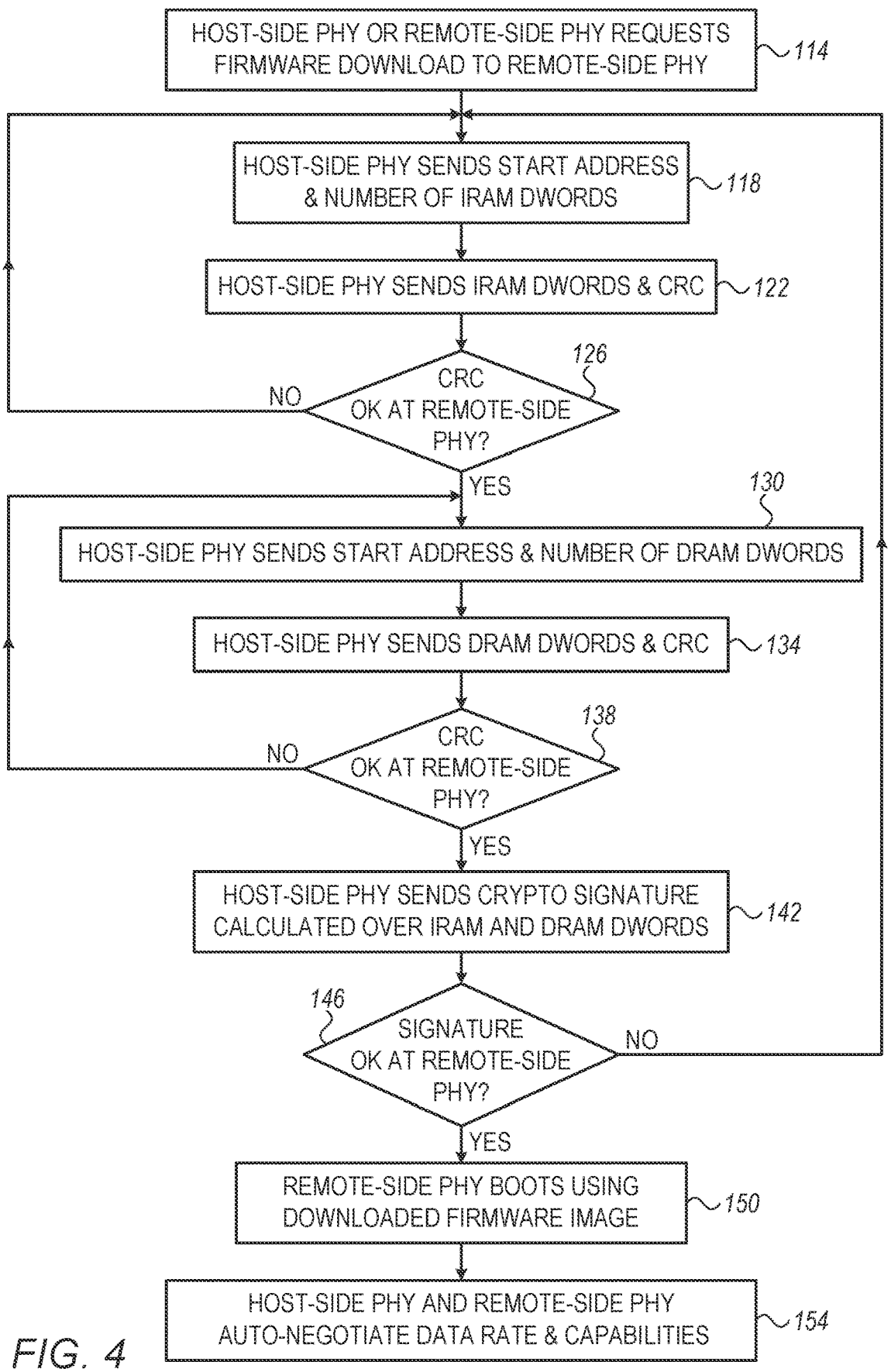
FIG. 4 is a flow chart that schematically illustrates a method for downloading a firmware image to a remote automotive Ethernet PHY device, in accordance with an embodiment that is described herein.

FIG. 4 is a flow chart that schematically illustrates a method for downloading a firmware image to a remote automotive Ethernet PHY device, in accordance with an embodiment that is described herein. As explained above, the firmware download process is performed using the auto-negotiation framework of IEEE 802.3, Clause 98.

The method begins in a firmware requesting operation 114, in which host-side PHY device 60 or remote-side PHY device 64 requests firmware download to remote-side PHY device 64. (In both cases, the firmware image is to be downloaded from host-side PHY device 60 to remote-side PHY device 64, but the request may be initiated by either of the PHY devices, i.e., either in a "pull" or "push" manner.) In an embodiment, FW download is requested by setting a 5-bit selector field, specified in Clause 98, to all-zeros. The other bits are set conventionally as specified in Clause 98, with the host-side PHY device set as Master (in bit D12) and the "Technology Selector" bits set to zero.

In response to the request, host-side PHY device 60 begins the process of downloading the FW image to remote-side PHY device 64. IRAM dWords 108 are downloaded first, and then DRAM dWords 112 are downloaded.

At an IRAM start notification operation 118, host-side PHY device 60 sends two Message Pages to remote-side PHY device 64, indicating the start address for storing IRAM dWords 108, and the number of IRAM dWords 108 that will be sent. In an embodiment, host-side PHY device 60 indicates that the message is formed of two Message Pages by setting Bit D13 in Next Page. The first Message Page ("Message 0" page) comprises a 32-bit start address, and the second Message Page ("Message 1" page) specifies the number of 32-bit IRAM dWords including CRC.

At an IRAM transmission operation 122, host-side PHY device 60 sends the IRAM dWords, followed by a 32-bit CRC word that is calculated over the IRAM dWords. The dWords and the CRC word are sent as raw, back-to-back data. This exchange does not necessarily follow any page format that is specified in Clause 98. µP 76 of remote-side PHY device 64 stores the received IRAM dWords in RAM 80.

At an IRAM CRC verification operation 126, µP 76 of remote-side PHY device 64 verifies the received CRC word (i.e., calculates a 32-bit CRC over the received IRAM dWords, and compares the calculated CRC and the received CRC). If the CRC verification is successful (i.e., the calculated CRC equals the received CRC), µP 76 of remote-side PHY device 64 sends a positive acknowledgement (ACK) to host-side PHY device 60, and the method proceeds to transmission of DRAM dWords 112. If the CRC verification fails, µP 76 sends a negative acknowledgement (NACK), and the method loops back to IRAM start notification operation 118 for repeating the transmission of IRAM dWords 108.

At a DRAM start notification operation 130, host-side PHY device 60 sends two Message Pages to remote-side PHY device 64, indicating the start address for storing DRAM dWords 112, and the number of DRAM dWords 112 that will follow. In an embodiment, host-side PHY device 60 indicates that the message is formed of two Message Pages by setting Bit D13 in Next Page. The first Message Page ("Message 2" page) comprises a 32-bit start address, and the second Message Page ("Message 3" page) specifies the number of 32-bit DRAM dWords including CRC.

At a DRAM transmission operation 134, host-side PHY device 60 sends the DRAM dWords, followed by a 32-bit CRC word calculated over the DRAM dWords. The dWords and the CRC word are sent as raw, back-to-back data. µP 76 of remote-side PHY device 64 stores the received DRAM dWords in RAM 80.

At a DRAM CRC verification operation 138, µP 76 of remote-side PHY device 64 verifies the received CRC word. If the CRC verification is successful, µP 76 sends an ACK to host-side PHY device 60. If the CRC verification fails, µP 76 sends a NACK, and the method loops back to DRAM start notification operation 130 for repeating the transmission of DRAM dWords 112.

At a signature transmission operation 142, host-side PHY device 60 sends remote-side PHY device 64 a cryptographic signature that signs (i.e., that is cryptographically calculated over) both IRAM dWords 108 and DRAM dWords 112. In an embodiment, the signature comprises an RSA3072 signature, and is sent as a "Message 4" Message Page. The message data also comprises the number of 32-bit dWords in the signature (96 in the case of RSA3072).

At a signature verification operation 146, µP 76 of remote-side PHY device 64 authenticates the received cryptographic signature. If authentication fails, the method loops back to operation 118 above, and the entire process of transferring the FW image, including IRAM and DRAM dWords, is repeated.

If authentication is successful, remote-side PHY device 64 sends an ACK, boots, and re-establishes Ethernet communication with host-side PHY device 60 in accordance with the newly-provided FW image, at a boot operation 150. Then, at an auto-negotiation operation 154, host-side PHY device 60 and remote-side PHY device 64 auto-negotiate a common data rate and a common set of capabilities. In an embodiment, the auto-negotiation process is performed in accordance with IEEE 802.3, Clause 98, cited above. In such an embodiment, the auto-negotiation typically involves exchanging 48-bit "Base Pages" as defined in Table 98-2 of Clause 98.

The method of FIG. 4 is an example method that is depicted solely for the sake of conceptual clarity. In alternative embodiments, any other suitable method for receiving a FW image over an Ethernet link can be used.

Although the embodiments described herein mainly address Ethernet PHY devices, the methods and systems described herein can also be used in other applications, such as in any other suitable PHY device having an embedded microprocessor, e.g., future Base-T PHY devices and/or optical PHY devices.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An Ethernet physical-layer (PHY) device, comprising:
    an analog front-end, configured to interface with an Ethernet link that is coupled to a peer Ethernet PHY device; and
    one or more processors, configured to receive a firmware image from the peer Ethernet PHY device over the Ethernet link, and to boot the Ethernet PHY device and establish Ethernet communication with the peer Ethernet PHY device in accordance with the received firmware image.

2. The Ethernet PHY device according to claim 1, wherein the one or more processors are configured to store the received firmware image in volatile memory.

3. The Ethernet PHY device according to claim 1, wherein the one or more processors are configured to receive the firmware image during an auto-negotiation transaction with the peer Ethernet PHY device.

4. The Ethernet PHY device according to claim 3, wherein the one or more processors are configured to request the firmware image from the peer PHY device, or to receive a notification of transmission of the firmware image, using a reserved value of a selector field in a base page of the auto-negotiation transaction.

5. The Ethernet PHY device according to claim 1, wherein the one or more processors are configured to boot the Ethernet PHY device in accordance with the received firmware image, and then to auto-negotiate a common data rate for the Ethernet communication with the peer Ethernet PHY device.

6. An Ethernet physical-layer (PHY) device, comprising:
    an analog front-end, configured to interface with an Ethernet link coupled to a peer Ethernet device; and
    a processor, configured to send a firmware image to a peer Ethernet PHY device over the Ethernet link, and to establish Ethernet communication with the peer Ethernet PHY device after the peer PHY device has booted in accordance with the received firmware image.

7. The Ethernet PHY device according to claim 6, wherein the processor is configured to send the firmware image during an auto-negotiation transaction with the peer Ethernet PHY device.

8. The Ethernet PHY device according to claim 7, wherein the processor is configured to notify the peer PHY device of transmission of the firmware image, or to receive a notification that the firmware image is requested, using a reserved value of a selector field in a base page of the auto-negotiation transaction.

9. The Ethernet PHY device according to claim 6, wherein the processor is configured to retrieve the firmware image of the peer PHY device from a non-volatile memory.

10. The Ethernet PHY device according to claim 6, wherein the processor is configured to obtain the firmware image of the peer PHY device from a local host, and to send the obtained firmware image to the peer Ethernet PHY device over the Ethernet link.

11. A method for Ethernet communication, comprising:
    in an Ethernet physical-layer (PHY) device, receiving a firmware image from a peer Ethernet PHY device over an Ethernet link; and
    booting the Ethernet PHY device and establishing Ethernet communication with the peer Ethernet PHY device in accordance with the received firmware image.

12. The method according to claim 11, wherein receiving the firmware image comprises storing the received firmware image in a volatile memory of the Ethernet PHY device.

13. The method according to claim 11, wherein receiving the firmware image is performed during an auto-negotiation transaction with the peer Ethernet PHY device.

14. The method according to claim 13, wherein further comprising requesting the firmware image from the peer PHY device, or receiving a notification of transmission of the firmware image, using a reserved value of a selector field in a base page of the auto-negotiation transaction.

15. The method according to claim 11, wherein establishing the Ethernet communication comprises booting the Ethernet PHY device in accordance with the received firmware image, and then auto-negotiating a common data rate for the Ethernet communication with the peer Ethernet PHY device.

16. A method for Ethernet communication, comprising:
    sending a firmware image from an Ethernet physical-layer (PHY) device to a peer Ethernet PHY device over an Ethernet link; and
    establishing Ethernet communication with the peer Ethernet PHY device after the peer PHY device has booted in accordance with the received firmware image.

17. The method according to claim 16, wherein sending the firmware image is performed during an auto-negotiation transaction with the peer Ethernet PHY device.

18. The method according to claim 17, further comprising notifying the peer PHY device of transmission of the firmware image, or receiving a notification that the firmware image is requested, using a reserved value of a selector field in a base page of the auto-negotiation transaction.

19. The method according to claim 16, wherein sending the firmware image comprises retrieving the firmware image of the peer PHY device from a non-volatile memory of the Ethernet PHY device.

20. The method according to claim 16, wherein sending the firmware image comprises obtaining the firmware image of the peer PHY device from a local host, and sending the obtained firmware image to the peer Ethernet PHY device over the Ethernet link.

* * * * *